(12) United States Patent
Kinnavy

(10) Patent No.: US 7,047,005 B2
(45) Date of Patent: May 16, 2006

(54) METHOD AND MOBILE STATION FOR ENABLING A PREFERRED SLOT CYCLE

(75) Inventor: Michael J. Kinnavy, Park Ridge, IL (US)

(73) Assignee: Motorola, Inc., Schaumburg, IL (US)

(*) Notice: Subject to any disclaimer, the term of this patent is extended or adjusted under 35 U.S.C. 154(b) by 502 days.

(21) Appl. No.: 10/024,890

(22) Filed: Dec. 18, 2001

(65) Prior Publication Data

US 2003/0114156 A1    Jun. 19, 2003

(51) Int. Cl.
*H04Q 7/20* (2006.01)
(52) U.S. Cl. .................. 455/434; 455/571; 455/574
(58) Field of Classification Search ............. 455/571, 455/574, 343.1, 67.11, 516, 517, 434
See application file for complete search history.

(56) References Cited

U.S. PATENT DOCUMENTS

| | | | |
|---|---|---|---|
| 5,392,287 A * | 2/1995 | Tiedemann et al. | 370/311 |
| 5,596,571 A * | 1/1997 | Gould et al. | 370/335 |
| 5,642,398 A * | 6/1997 | Tiedemann et al. | 455/426.1 |
| 6,453,181 B1 * | 9/2002 | Challa et al. | 455/574 |
| 6,560,453 B1 * | 5/2003 | Henry et al. | 455/67.11 |
| 6,577,608 B1 * | 6/2003 | Moon et al. | 370/311 |

FOREIGN PATENT DOCUMENTS

WO    WO-01/60103 A1    8/2001

OTHER PUBLICATIONS

International Search Report PCT/US02/38085 dated Mar. 19, 2003.

* cited by examiner

*Primary Examiner*—Joseph Feild
*Assistant Examiner*—S. Smith

(57) ABSTRACT

In accordance with the preferred embodiments of the present invention, a method (400) and a mobile station (160) for enabling a preferred slot cycle are described herein. The mobile station (160) monitors for transmission from a base station (140) via a communication resource (210) based on an operating slot cycle index (SCI) corresponding to an operating slot cycle. The mobile station (160) generally includes a receiving unit (320), a transmitting unit (330) and a controller (340). The receiving unit (320) receives control information associated with slot cycles operable by the base station (140). The controller (340) is operable to adjust the operating SCI to a preferred SCI in response to a trigger event. The preferred SCI corresponds to a preferred slot cycle. The transmitting unit (330) transmits the preferred SCI to the base station (140) so that the mobile station (160) is in communication with the base station (140) via the communication resource during a slot, which reoccurs based on the preferred slot cycle.

22 Claims, 2 Drawing Sheets

*FIG. 3*
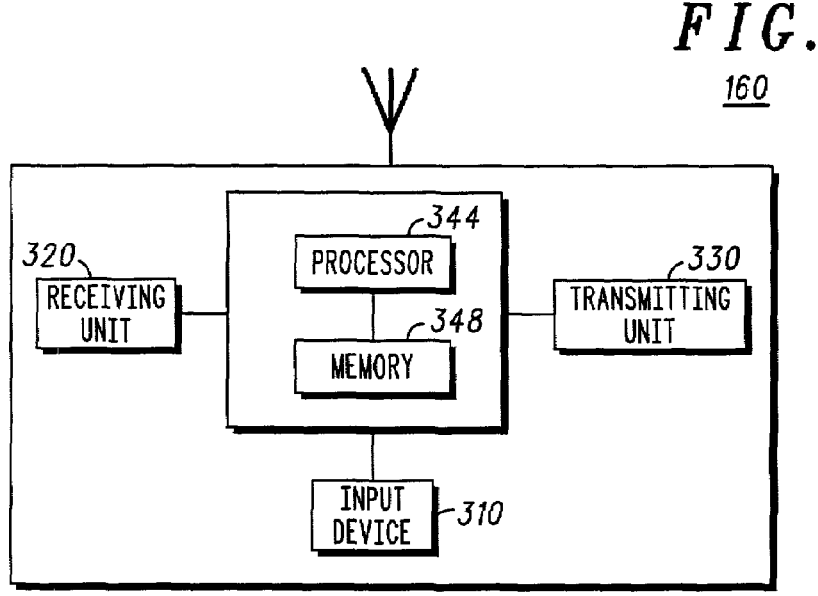
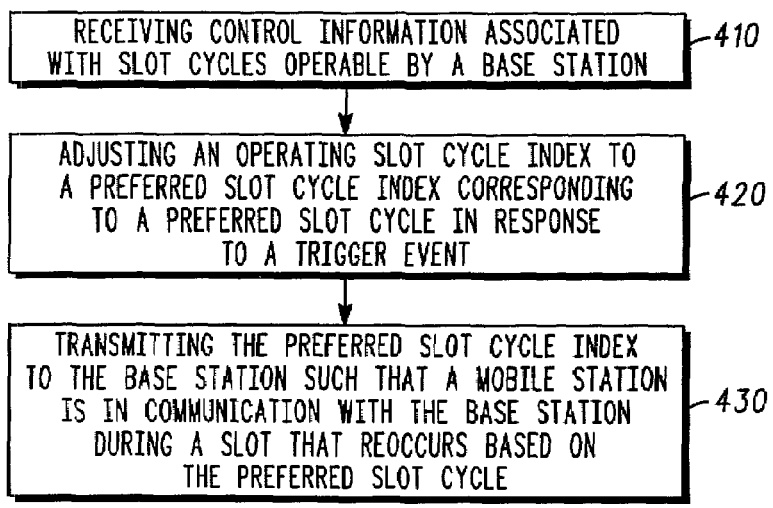
*FIG. 4*

US 7,047,005 B2

METHOD AND MOBILE STATION FOR ENABLING A PREFERRED SLOT CYCLE

FIELD OF THE INVENTION

The present invention relates to wireless communication systems, and more particularly, to a method and a mobile station for enabling a preferred slot cycle.

BACKGROUND OF THE INVENTION

A wireless communication system is a complex network of systems and elements. Typically elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller (e.g., a mobile switching center (MSC)) or switch, typically a call agent (i.e., a "softswitch"), for routing calls within the system, and (5) a link to the land line or public switch telephone network (PSTN), which is usually also provided by the call agent.

Typically, a base station communicates with mobile stations via a forward link, which includes a forward paging channel (F-PCH). In particular, the paging channel may be used for transmission of messages such as paging messages associated with incoming calls (i.e., notification of incoming calls) and overhead messages (i.e., including control information) from the base station to the mobile stations. In a wireless communication system operating in accordance with a code division multiple access (CDMA) based communication protocol, for example, mobile stations are allocated a "slot" as to when to "listen" to the paging channel for messages. Typically, each mobile stations turns on a receiving unit (e.g., the mobile station "wakes up" from being idle) to monitor for a paging message and/or an overhead message from the base station during the slot, which occurs based on an operating slot cycle index (SCI). The operating SCI corresponds to an operating slot cycle, which is the period in which the slot reoccurs for the mobile station to monitor for transmission from the base station on the paging channel. That is, if there is no transmission from the base station, the receiving unit is turned off until the slot reoccurs according to the operating slot cycle. For example, the mobile station wakes up and monitors for transmission every 1.28, 2.56, 5.12, 10.24, 20.48, 40.96, 81.92 and 163.94 seconds with the SCI as a slot number from one of zero (0), one (1), two (2), three (3), four (4), five (5), six (6) and seven (7), respectively. The mobile station turns on the receiving unit (i.e., wakes up) more often to listen to the paging channel with a lower operating SCI. As a result, more power is conserved by the mobile station with a higher operating SCI.

The mobile station determines the operating SCI based on an internal SCI and a broadcasted SCI. In particular, the internal SCI may be pre-stored in the mobile station whereas the broadcasted SCI may be transmitted to the mobile station by the base station via the paging channel. Further, the broadcasted SCI may be determined by the base station based on the availability of communication resources. Typically, the mobile station uses the smaller of the internal SCI and the broadcasted SCI as the operating SCI. Thus, the base station controls how often a mobile station may "wake up" to monitor for transmission from the base station via the paging channel.

One aspect of designing a wireless communication system is to optimize the resources available to the wireless communication system. For example, a base station may provide a low broadcasted SCI (i.e., lower than the internal SCI) to assure short call setup times to give a mobile station more opportunities to receive a paging message associated with an incoming call and/or an overhead message including control information. Alternatively, the internal SCI may be set to a lower value than the broadcasted SCI such that the mobile station may use the internal SCI as the operating SCI at all times. In this case, the base station may lose control over call setup times for all mobile stations serviced by the base station. Nonetheless, a low value of either the internal SCI or the operating SCI (i.e., a short slot cycle) increases resource and power consumption by the mobile station. Longer slot cycles increase the capacity of the forward paging channel by reducing the frequency at which mobile stations access the forward paging channel and allow the mobile stations to conserve power. However, longer slot cycles may result in longer call setup times leading to customer dissatisfaction. That is, a short slot cycle may be desired in certain situations. For example, a user may wish for a shorter slot cycle in an emergency than during normal circumstances. In another example, emergency personnel such as police officers and firefighters may desire and/or need to select a shorter slot cycle when they are on duty as oppose to when they are off duty.

Therefore, a need exist for the mobile station to enable a preferred slot cycle to optimize communication resources of the wireless communication system and to conserve power of the mobile station.

BRIEF DESCRIPTION OF THE DRAWINGS

FIG. 3 is a block diagram representation of a mobile station that may be adapted to operate in accordance with the preferred embodiments of the present invention.

FIG. 4 is a flow diagram illustrating a method for enabling a preferred slot cycle in accordance with the preferred embodiments of the present invention.

DETAILED DESCRIPTION OF THE PREFERRED EMBODIMENTS

Figure 1:
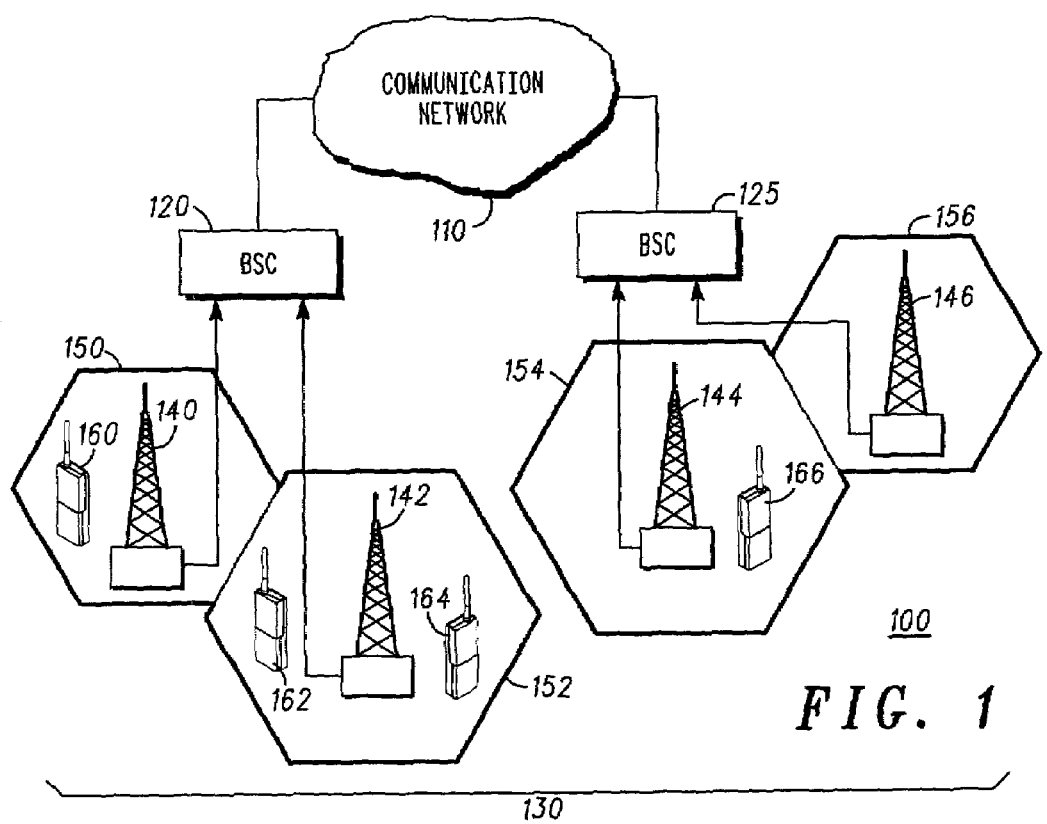
FIG. 1 is a block diagram representation of a wireless communication system that may be adapted to operate in accordance with the preferred embodiments of the present invention.

Preferred embodiments of a method and a mobile station for enabling a preferred slot cycle in a wireless communication system are described. The communication system provides communication service to a mobile station. In particular, the mobile station monitors for transmission from a base station via a communication resource based on an operating slot cycle index (SCI) corresponding to an operating slot cycle. For example, the mobile station monitors for a paging message associated with an incoming call and/or an overhead message including control information from the base station via a paging channel during a slot assigned to the mobile station. The slot reoccurs based on the operating slot cycle. The mobile station receives control information associated with slot cycles operable by the base station. The mobile station adjusts the operating SCI to a preferred SCI in response to a trigger event. Examples of the preferred SCI may be, but is not limited to, a slot number including one of zero (0), one (1), two (2), three (3), four (4), five (5), six (6) and seven (7). The preferred SCI corresponds to a preferred slot cycle, which is one of the slot cycles operable by the base station. That is, if the preferred SCI is greater than the operating SCI then the preferred slot cycle is longer than the operating slot cycle whereas if the preferred SCI is less than the operating SCI then the preferred slot cycle is shorter than the operating slot cycle. The trigger event may be, but is not limited to, a user-selectable input, a voice input, and an operating characteristic associated with the mobile station. For example, a user may select the preferred SCI such that the mobile station may adjust the operating SCI to the preferred SCI in response to the user pressing a key on a numeric keypad or providing a voice command via a microphone of the mobile station. The user may also pre-select the preferred SCI such that the mobile station may automatically adjust the operating SCI to the preferred SCI in response to an operating characteristic associated with the mobile station. To illustrate this automatic feature, the mobile station may automatically adjust the operating SCI to the preferred SCI in response to the mobile station being in idle, i.e., the mobile station is in an inactive mode. In another example, the mobile station may automatically adjust the operating SCI to the preferred SCI in response to the mobile station being at a battery power threshold, e.g., low battery power. As a result of the occurrence of the trigger event, the mobile station transmits the preferred SCI to the base station so that the mobile station is in communication with the base station via the communication resource during a slot, which reoccurs based on the preferred slot cycle.

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
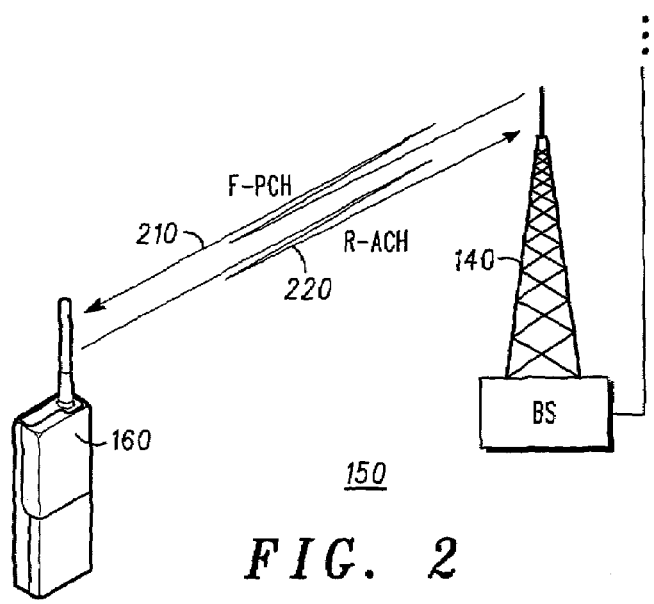
FIG. 2 is a block diagram representation of a communication cell that may be adapted to operate in accordance with the preferred embodiments of the present invention.

Referring to FIG. 2, the communication cell 150 generally includes the base station 140 and a plurality of mobile stations with one shown as 160. The base station 140 provides communication service to the mobile station 160. The mobile station 160 monitors for transmission from the base station 140 via a communication resource 210 during a slot. For example, the mobile station 160 may "wake up" from being idle (e.g., inactive mode) to monitor for a paging message associated with an incoming call and/or an overhead message including control information from the base station 140 via a forward paging channel (F-PCH) 210 during the slot. The slot is based on an operating slot cycle index (SCI) that corresponds to an operating slot cycle. That is, the operating slot cycle corresponds to how often the slot reoccurs for the mobile station 160 to monitor for transmission from the base station 140 via the communication resource 210. The mobile station 160 may determine an operating SCI based on an internal SCI and a broadcasted SCI as one of ordinary skill in the art will readily recognize. The internal SCI may be pre-stored in the mobile station 160 whereas the broadcasted SCI may be provided by the base station 140. Typically, the mobile station 160 determines an operating SCI using the minimum of the internal SCI and the broadcasted SCI to control call setup time. For example, the mobile station 160 may have an internal SCI of three (3) and receive a broadcasted SCI of one (1). Thus, the operating SCI for the mobile station 160 may be one (1) because the broadcasted SCI of one (1) is less than the internal SCI of three (3). Accordingly, the operating slot cycle corresponding to the operating SCI of one (1) is 2.56 seconds as one of ordinary skill in the art will readily recognize, i.e., operating slot cycle may be $2^n \times 1.28$ (sec), where n is the operating SCI. As a result of the operating SCI being one (1), the mobile station 160 monitors for transmission from the base station 140 during a slot that reoccurs every 2.56 seconds.

The mobile station 160 may enable a preferred SCI associated with a preferred slot cycle to monitor for transmission from the base station 140 via the paging channel 210 in accordance with a preferred embodiment of the invention. In particular, the mobile station 160 receives control information associated with slot cycles operable by the base station 140 (i.e., the capability of the base station 140). Based on the control information, the mobile station 140 may adjust the operating SCI to a preferred SCI corresponding to a preferred slot cycle, which is one of the slot cycles operable by the base station 140. Examples of the preferred SCI may be, but is not limited to, a slot number from one of including one of zero (0), one (1), two (2), three (3), four (4), five (5), six (6) and seven (7). The preferred slot cycle may be longer than the operating slot cycle if the preferred SCI is greater than the operating SCI. That is, the slot may reoccur less often in the preferred slot cycle than in the operating slot cycle so that mobile station 160 monitors for transmission from the base station 140 less frequently during the preferred slot cycle to converse power. For example, the mobile station 160 may enable a preferred SCI of four (4), which may correspond to a preferred slot cycle of 20.48 seconds, to conserve battery power of the mobile station 160 rather than using a lower operating SCI (i.e., an operating SCI of three (3) or less). The mobile station 160 transmits the preferred SCI to the base station 140 via a reverse control channel 220 (e.g., a reverse access channel (R-ACH)) to indicate that the mobile station 160 is operating at the preferred slot cycle associated with the preferred SCI. As a result of informing the base station 140 with the preferred SCI, the mobile station 160 is in communication with the base station 160 via the communication resource 210 during a slot that reoccurs based on the preferred slot cycle. Thus, in the example described above, the mobile station 160 monitors for transmission from the base station 140 via the communication resource 210 during a slot that reoccurs every 20.48 seconds.

A user may select a preferred SCI that is less than operating SCI such that the preferred slot cycle is shorter than the operating slot cycle. For example, emergency personnel such as police officers and firefighters may select and adjust their mobile stations to operate at a preferred slot cycle shorter than the operating slot cycle to be more accessible when they are on duty. Thus, the mobile station 160 may operate at a preferred slot cycle to conserve battery power and/or to meet the need of the user.

As shown in FIG. 3, a mobile station 160 is adapted in accordance with a preferred embodiment of the invention to enable a preferred slot cycle. The mobile station 160 generally includes a user input device 310, a receiving unit 320, a transmitting unit 330, and a controller 340. The user input device 310 may be, but is not limited to, a numeric keypad, an alphanumeric keypad, a touch-sensitive display, and a microphone. Further, the user input device 310, the receiving unit 320 and the transmitting unit 330 are operatively coupled to the controller 340, which includes, but is not limited to, a processor 344 and a memory 348. The processor 344 is operatively coupled to the memory 348, which stores a program or a set of operating instructions for the processor 344. The processor 344 executes the program or the set of operating instructions such that the mobile station 160 operates in accordance with a preferred embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

As noted above, the mobile station 160 is in communication with a base station (e.g., base station 140 shown in FIG. 2) via a communication resource (e.g., a forward paging channel) such that the mobile station 160 monitors for transmission of messages (e.g., a paging message associated with an incoming call and/or an overhead message including control information) from the base station 140 during a slot. The slot reoccurs based on an operating slot index (SCI) corresponding to an operating slot cycle. That is, the mobile station 160 periodically monitors for transmission via the forward paging channel during the slot, which reoccurs every operating slot cycle.

A basic flow for enabling a preferred slot cycle that may be applied with the preferred embodiment of the present invention shown in FIG. 3 may start with the receiving unit 320 receiving control information associated with slot cycles operable by a base station 140. The control information may indicate the slot cycles that are supported by the base station 140, which is in communication with the mobile station 160 via the forward paging channel. The controller 340 is operable to adjust the operating SCI to a preferred SCI in response to a trigger event. The preferred SCI corresponds to a preferred slot cycle, which is one of the slot cycles supported by the base station 140. Examples of the trigger event may be, but is not limited to, a user-selectable input, a voice input, and an operating characteristic associated with the mobile station 160. To illustrate the trigger event concept, the controller 340 may adjust the operating SCI to the preferred SCI in response to a user of the mobile station 160 pressing a key on the input device 310 (e.g., a numeric pad) or providing a voice command via a microphone for adjusting the operating slot cycle. Alternatively, a user may also pre-select the preferred SCI such that the controller 340 may automatically adjust the operating SCI to the preferred SCI in response to an operating characteristic associated with the mobile station 160. For example, the controller 340 may automatically adjust the operating SCI to the preferred SCI in response to the mobile station 160 being idle, i.e., in an inactive mode. To conserve power, the controller 340 may automatically adjust the operating SCI to the preferred SCI in response to the mobile station being at a battery power threshold (e.g., 20% of full battery power). As a result of the trigger event, the transmitting unit 330 transmits the preferred SCI to the base station 140 so that the mobile station 160 is in communication with the base station 140 via the forward paging channel during a slot, which reoccurs based on the preferred slot cycle.

In accordance with the preferred embodiments of the present invention, and with references to FIG. 4, a method 400 for enabling a preferred slot cycle is shown. Method 400 begins at step 410, where a controller of a mobile station receives control information associated with slot cycles operable by a base station, which is in communication with the mobile station. For example, the control information may indicate slot cycles that are supported by the base station. At step 420, the controller adjusts the operating SCI to a preferred SCI in response to a trigger event. The preferred SCI may be, but is not limited to, a slot number from one of including one of zero (0), one (1), two (2), three (3), four (4), five (5), six (6) and seven (7). Further, the preferred SCI corresponds to a preferred slot cycle such that the preferred slot cycle is longer than the operating slot cycle if the preferred SCI is greater than the operating SCI. That is, the mobile station monitors for transmission via a paging channel less frequently with the preferred SCI greater than the operating SCI. Accordingly, if the preferred SCI is less than the operating SCI then the preferred slot cycle is shorter than the operating SCI (i.e., the mobile station monitors for transmission via the paging channel more frequently). The trigger event may be, but is not limited to, a user-selectable input, a voice input, and an operating characteristic associated with the mobile station. For example, the controller may adjust the operating SCI to the preferred SCI in response to a user selecting the preferred SCI feature on a user input device of the mobile station. Further, the user may also pre-select the preferred SCI such that the controller may automatically enable the preferred SCI in response to an operating characteristic associated with the mobile station. To illustrate this automatic enablement concept, the controller may adjust the operating SCI to the preferred SCI in response to the mobile station being at a battery power threshold (e.g., low battery power). As a result of the trigger event, the controller transmits the preferred SCI to the base station at step 430. For example, the controller may transmit a registration including the preferred SCI to the base station. Thus, the mobile station monitors for transmission from the base station via the paging channel during a slot that reoccurs based on the preferred slot cycle.

Many changes and modifications could be made to the invention without departing from the fair scope and spirit thereof. The scope of some changes is discussed above. The scope of others will become apparent from the appended claim.

What is claimed:

1. In a wireless communication system, the communication system providing communication service to a mobile station, wherein the mobile station monitors for transmission from a base station via a communication resource based on an operating slot cycle index corresponding to an operating slot cycle, and wherein the mobile station is operable to enable a preferred slot cycle, the mobile station comprising:

a user input device;

a receiving unit adapted to receive control information associated with slot cycles operable by the base station;

a controller operatively coupled to the user input device and the receiving unit, the controller comprising a processor and a memory operatively coupled to the processor, and the controller being programmed to adjust the operating slot cycle index to a preferred slot cycle index in response to a trigger event, wherein the preferred slot cycle index corresponds to a preferred slot cycle; and a transmitting unit coupled to the controller, the transmitting unit being operable to transmit the preferred slot cycle index to the base station so that the mobile station is in communication with the base station via the communication resource during a slot, the slot reoccurring based on the preferred slot cycle, wherein the preferred slot cycle is one of the slot cycles operable by the base station.

2. The mobile station of claim 1, wherein the preferred slot cycle index comprises a preferred slot cycle index greater than the operating slot cycle index such that the preferred slot cycle is longer than the operating slot cycle.

3. The mobile station claim 1, wherein the preferred slot cycle index comprises a preferred slot cycle index less than the operating slot cycle index such that the preferred slot cycle is shorter than the operating slot cycle.

4. The mobile station of claim 1, wherein the preferred slot cycle index comprises a preferred slot cycle index of a slot number including one of zero (0), one (1), two (2), three (3), four (4), five (5), six (6) and seven (7).

5. The mobile station of claim 1, wherein the user-input device comprises a numeric keypad, an alphanumeric keypad, a touch-sensitive display, and a microphone.

6. The mobile station of claim 1, wherein the trigger event comprises one of a user-selectable input, a voice input, and an operating characteristic associated with the mobile station.

7. The mobile station of claim 1, wherein the trigger event comprises the mobile station being at a battery power threshold.

8. The mobile station of claim 1, wherein the trigger event comprises the mobile station being idle.

9. The mobile station of claim 1, wherein the communication resource comprises a paging channel.

10. The mobile station of claim 1, wherein the mobile station operates in accordance with a code division multiple access (CDMA) based communication protocol.

11. In a wireless communication system, the communication system for providing communication service for a mobile station, wherein the mobile station monitors for transmission from a base station via a communication resource based on an operating slot cycle index corresponding to an operating slot cycle, and wherein a processor operates in accordance with a computer program embodied on a computer-readable medium for enabling a preferred slot cycle, the computer program comprising:

a first routine that directs the processor to receive control information associated with slot cycles operable by the base station;

a second routine that directs the processor to adjust the operating slot cycle index to a preferred slot cycle index in response to a trigger event, a preferred slot cycle index, the preferred slot cycle index corresponding to a preferred slot cycle; and a third routine that directs the processor to transmit the preferred slot cycle index to the base station so that the mobile station is in communication with the base station during a slot, the slot reoccurring based on the preferred slot cycle, wherein the preferred slot cycle is one of the slot cycles operable by the base station.

12. The computer program of claim 11, wherein the second routine comprises a routine that directs the processor to adjust the operating slot cycle index to a preferred slot cycle index being greater than the operating slot cycle index such that the preferred slot cycle is longer than the operating slot cycle.

13. The computer program of claim 11, wherein the second routine comprises a routine that directs the processor to adjust the operating slot cycle index to a preferred slot cycle index being less than the operating slot cycle index such that the preferred slot cycle is shorter than the operating slot cycle.

14. The computer program of claim 11, wherein the second routine comprises a routine that directs the processor to adjust the operating slot cycle index to the preferred slot cycle index in response to a user-selectable input, a voice input, and an operating characteristic associated with the mobile station.

15. The computer program of claim 11, wherein the second routine comprises a routine that directs the processor to adjust the operating slot cycle index to a preferred slot cycle index in response to the mobile station being at a battery power threshold.

16. The computer program of claim 11, wherein the second routine comprises a routine that directs the processor to adjust the operating slot cycle index to a preferred slot cycle index in response to the mobile station being idle.

17. The computer program of claim 11, wherein the second routine comprises a routine that directs the processor to adjust the operating slot cycle index to a slot number including one of zero (0), one (1), two (2), three (3), four (4), five (5), six (6) and seven (7) in response to a trigger event.

18. The computer program of claim 11, wherein the third routine comprises a routine that directs the processor to transmit the preferred slot cycle index to the base station so that the mobile station is in communication with the base station via a paging channel during a slot.

19. The computer program of claim 11, wherein the third routine comprises a routine that directs the processor to transmit the preferred slot cycle index to the base station via a registration so that the base station is in communication with the mobile station via the communication resource during a slot.

20. The computer program of claim 11, wherein the third routine comprises a routine that directs the processor to transmit the preferred slot cycle index to the base station via an access channel so that the base station is in communication with the mobile station via the communication resource during a slot.

21. The computer program of claim 11, wherein the computer program operates in accordance with a code division multiple access (CDMA) based communication protocol.

22. The computer program of claim 11, wherein the medium is one of paper, a programmable gate array, application specific integrated circuit, erasable programmable read only memory, read only memory, random access memory, magnetic media, and optical media.

* * * * *